United States Patent Office 3,813,236
Patented May 28, 1974

3,813,236
SUSTAINED RELEASE PESTICIDE COMPOSITIONS AND METHOD OF USING
George Graham Allan, Seattle, Wash., assignor to Weyerhaeuser Company, Tacoma, Wash.
No Drawing. Continuation of application Ser. No. 832,464, June 11, 1969, which is a continuation-in-part of application Ser. No. 593,707, Nov. 14, 1966, both now abandoned. This application Dec. 28, 1970, Ser. No. 102,177
Int. Cl. A01n 9/08, 9/22
U.S. Cl. 71—94                                 20 Claims

ABSTRACT OF THE DISCLOSURE

Organic pesticides are chemically combined with an inert natural polymer substrate such as a lignin or lignin containing material, tree bark, cellulose or proteinaceous material. When exposed to environmental conditions the chemical bond between the polymer and the pesticide is broken by hydrolysis to yield a pesticidal amount of the free pesticide over an extended period of time.

This application is a continuation of application Ser. No. 832,464, filed June 11, 1969, now abandoned, which prior application was a continuation-in-part of application Ser. No. 593,707, filed Nov. 14, 1966, and now abandoned.

BACKGROUND OF THE INVENTION

Field of the invention

This invention relates to sustained release biologically active compositions and the process of making such compositions.

Prior art relating to the disclosure

Many biologically active materials, such as herbicides or insecticides, when applied to soil, lose their effectiveness in a short period of time because of volatilization, leaching, sorption by organic matter and chemical and microbiological degradation. To compensate for the loss of activity in the manner described users of the pesticides have employed amounts in excess of that necessary. However, this cannot be done in many instances because of the toxicity level of certain of the pesticides to animals or because of the potential herbicidal damage to plants other than the undesirable vegetation to be controlled. Sustained release compositions, on the other hand, can be applied to the soil in amounts which provide a substantially constant active pesticidal amount of pesticide over prolonged periods of time.

Attempts have been made to produce sustained release compositions by physically mixing pesticides with various substances. The release rates of such compositions, however, have not been entirely satisfactory. In United States Patent No. 3,343,941 reference is made to chemically combining certain herbicides to water insoluble alkyd resins. On application to the situs which is to be controlled the herbicidally active portion is slowly released to act as a toxicant upon the undesirable vegetation.

SUMMARY OF THE INVENTION

This invention relates to biologically active compositions that are rendered temporarily inactive by chemically combining a material such as an herbicide to a natural polymeric substrate. The composition, on exposure to environmental conditions, becomes active by release of the material from the polymer due to hydrolysis of the attaching chemical bond.

It is an object of this invention to provide a pesticidal composition which has a controlled release rate by chemically combining a pesticide with a natural polymeric substrate so that attack by soil environment is reduced and so that the material cannot be substantially leached into the sub-soil by rain where it becomes inaccessible to the vegetation it is intended to control.

Another object of this invention is to provide a pesticidal composition chemically combined with a natural polymeric substrate by a chemical bond which is subsequently broken on exposure to environmental conditions to produce a pesticidal amount of the active pesticide.

Another object of this invention is to provide a method of preparing a pesticidal composition capable of releasing a pesticidal amount of active pesticide over prolonged periods of time on exposure to environmental conditions.

DETAILED DESCRIPTION OF THE INVENTION

To chemically combine the pesticides mentioned hereinafter with an inert natural polymer substrate involves a chemical reaction between active groups on both the pesticide and the inert polymeric substrate. The reaction, for example, between 2,4-dichlorophenoxyacetic acid and a lignin containing material may be depicted as below;

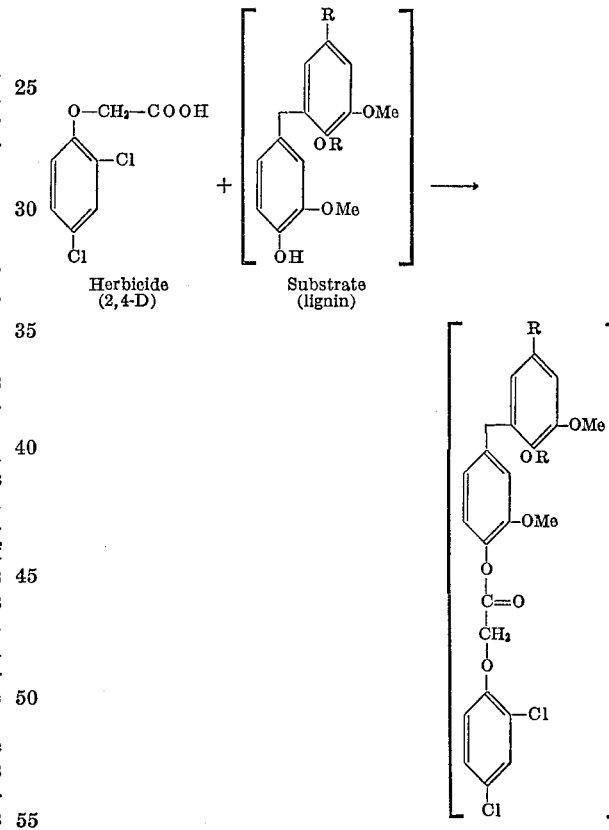

The pesticides useful in this invention all have a replaceable hydrogen atom capable of chemically combining with natural polymer substances containing active hydroxyl, carboxyl and amino groups. The chemical bond between the polymer and the herbicide is broken by hydrolysis when the composition is placed in the soil to give an active amount of the free pesticide.

The natural polymer substrates used in this invention are lignin containing, cellulosic or proteinaceous materials. Natural polymers falling within the above groups and having the requisite functionality to combine with the pesticides include: (1) natural forest products such as tree bark and comminuted wood, for example Douglas-fir, alder, cedar and hemlock; (2) cellulose; (3) lignins and lignin-like materials such as kraft, sulfite and soda lignin, caustic extract of barks, and tannins; (4) lignocellulosic agricultural wastes such as corncobs, oat hulls, bran and bagasse; and (5) proteinaceous materials containing active primary amino groups such as fishmeal and soy bean flour. For the purposes of definition in this invention all of the foregoing natural polymers except cellulose and proteinaceous materials are referred to as lignin containing materials.

The pesticides that can be chemically combined with the natural polymers mentioned above include those having attached carboxyl, amino or hydroxyl groups. These can be reacted with available groups on the substrate to form hydrolysable ester or amide linkages. A pesticide having free carboxyl groups could thus be readily attached to a substrate such as a lignin or lignocellulose having a multiplicity of reactive hydroxyl sites or to a proteinaceous material such as soybean or fishmeal having amino groups. A pesticide with free hydroxyl or amino groups could, for example, be easily combined with the carboxyl groups present in natural tree barks or in the phenolic acids obtained by alkaline extraction of barks. Pesticidal materials of particular importance are the growth regulating agents based on organic monobasic halogenated carboxylic acids. These include halophenylaliphatic acids, halo-phenoxyaliphatic acids, halo-substituted benzoic acids, polyhalogenated aliphatic acids, and polysubstituted picolinic acids. Some of the specific pesticides that may be employed include:

2,4-dichlorophenoxyacetic acid (2,4-D)
2,2-dichloropropionic acid (Dalapon)
2,5-dichloro-3-nitrobenzoic acid (Dinoben)
2,3,6-trichlorophenylacetic acid (Fenac)
4-(2-methyl-4-chlorophenoxy) butyric acid (4-MCPB)
4-(2,4-dichlorophenoxy) butyric acid (4-[2,4-DB])
2-methyl-4-chlorophenoxyacetic acid (MCPA)
2-(2-methyl-4-chlorophenoxy) propionic acid (MCPP)
2-(2,4,5-trichlorophenoxy) propionic acid (Silvex)
trichloroacetic acid (TCA)
2,3,6-trichlorobenzoic acid (2,3,6-TBA)
2-(2,4-dichlorophenoxy) propionic acid (2-[2,4 DP])
3-amino-2,5-dichlorobenzoic acid (Amiben)
4-amino-3,5,6-trichloropicolinic acid (Tordon)
2-methoxy-3,6-dichlorobenzoic acid (Banvel-D)
2-methoxy-3,5,6-trichloro benzoic acid (Banvel-T)
2,4,5-trichlorophenoxyacetic acid (2,4,5-T)
4-(2,4,5-trichlorophenoxy) butyric acid (2,4,5-TB)
7-oxabicyclo (2.2.D heptane-2,3 dicarboxylic acid (Endothall)
N-1-naphthylphthalamic acid (Naptalan)
2,3,6-trichlorobenzyloxypropanol (TBP)

Exemplary of the non-carboxyl pesticides are:

3-amino-1,2,4-triazole (Amitrole)
4-hydroxy-2,3,5-trichloropyridine (Daxtron)
2',5-dichloro-4'-nitrosalicylanilide ethanolamine (Bayluscide)
3,5-dibromo-4-hydroxybenzonitrile (Bromoxynil)
3-[2-(3,5-dimethyl-2-oxocyclohexyl)-2-hydroxyethyl] glutarimide (cycloheximide)
1,3-bis(1-hydroxy-2,2,2-trichloroethyl)urea (DCU)
3,5-diiodo-4-hydroxybenzonitrile (Ioxynil)
O,O-dimethyl (2,2,2-trichloro-1-hydroxyethyl) phosphonate (Trichlorfon)
O,S-dimethyl phosphoramidithioate (Monitor)
5-amino-4-chloro-2-phenyl-3(2H)-pyridazinone (Pyrazone)

The pesticidal compositions of this invention are prepared by dissolving or dispersing the polymer and pesticide in a diluent and reacting in the presence of a catalyst at elevated temperatures. The diluents which may be used are those which wet and swell the polymer substrate and in which the herbicide is substantially soluble. Solvents which may be used include dioxan, tetrahydrofuran, pyridine, dimethylformamide and the like. Benzene and acetone may be mixed with the above solvents if desired. The reaction mixture plus a catalyst is heated to a temperature sufficient to initiate and maintain the reaction, usually about 100° C. for a period of from 1 to 3 hours. The mixtures can be reacted for longer times under more moderate temperature conditions. When reacting certain hydroxyl containing polymer substrates with certain acid pesticides it is desirable to convert the pesticide to an acid chloride before reaction with the substrate. Reactants such as thionyl chloride may be used to form the acid chloride from the free acid.

When employing pesticides having labile groups, care should be taken to employ reaction conditions which will not split off these sensitive groups from the pesticide. Also, since certain pesticides have chemical bonds within their molecular structure that will cleave upon hydrolysis, care should be taken to insure that the weaker bond is between the herbicide and polymer substrate.

When the reaction mixture is homogeneous a precipitating agent may be added to the reaction mixture and the precipitate collected by filtration. The filtrate can be washed and dried to yield a finely divided material which contains the combined polymer substrate and pesticide.

When the reaction mixture is heterogeneous the volatile reaction medium is removed by evaporation to yield a residue of chemically combined pesticide and polymer substrate. The weight ratio of pesticide to polymer substrate in both heterogenous and homogeneous systems depends upon the functionality of the polymer substrate and the molecular weight of the pesticide. A weight ratio of pesticide to polymer substrate ranging from 0.01 to 2:1 is adequate.

It is generally desirable for the pesticidal product to be water insoluble. If the polymeric substrate is normally water soluble, as for example a sulfite lignin, sufficient pesticide should be reacted with the substrate to produce a product of low solubility.

Release of varying amounts of active pesticide can be controlled by the ratio of pesticide to polymer substrate and the nature of the polymer substrate. The amount of pesticide that is chemically bonded to the polymer substrate dictates the time which is needed to hydrolyze the composition to release pesticidal amounts of the active compound. The particular substrate selected has some effect on the release mechanism by virtue of its chemical structure. Thus, the amount of pesticide that is released over a given period of time can be controlled by selecting the type of polymer substrate used. The sustained release compositions of this invention have numerous advantages to the ultimate user over other known pesticide compositions, these advantages including ease in handling solids as opposed to liquids, reduced toxicity to humans and other animal life, controlled continuous release of the active pesticide components, lower risk of over application, and fewer and more efficient applications.

The exposure of a viable form of plant to the action of the herbicidal compositions disclosed gives rise to different responses depending upon the nature of the plant, the stage of growth or maturity of the plant, the amount of herbicidal composition used, the release rate of the active herbicide and the particular herbicide emyloyed. Application to plants, plant parts and their habitats of an herbicidal amount of the herbicide compositions suppresses and inhibits growth of such plants. Application of the herbicide compositions may be made by mulching or disking the compositions into the soil or merely by applying the composition to the surface of the soil. The exact dosage applied to the soil depends on the release rate of the composition, the vegetation to be controlled and the herbicide employed.

The following examples illustrate the best manner of preparing the pesticidal compositions of the present invention and illustrate the manner in which the compositions are to be used.

EXAMPLE 1

A mixture of 165 g. of 4 - (2,4,5 - trichlorophenoxy) butyric acid and excess thionyl chloride (100 ml.) was treated with dimethylformamide (2 ml.) refluxed for three hours and evaporated to dryness under reduced pressure. The oily product, 4-(2,4,5 - trichlorophenoxy) butyryl chloride, was dissolved in dioxan (500 ml.), added to a solution of dry kraft lignin (500 g.) in dioxan (1000 ml.) and pyridine (80 ml.), and heated on a steam bath for three hours. The reaction mixture was then concentrated to about half its bulk and precipitated by addition to vigorously stirred hexane. The precipitate, collected by filtration, was dried, exhaustively washed with water, and redried to yield a brown powder (656 g.) which contained both free (1.75%) combined (21.9%) 4-(2,4,5-trichlorophenoxy) butyric acid. Tests indicate outstanding herbicidal effects are obtained in soil over a prolonged period of time.

EXAMPLE 2

2,4-dichlorophenoxyacetic acid (22.1 g.) was converted to the corresponding acid chloride in the same manner described in Example 1 and heated for 45 minutes with kraft lignin (30 g.) in dioxan (200 ml.) and pyridine (7.9 g.) containing suspended diatomaceous earth (47.1 g.). Evaporation of the solvent under reduced pressure gave a sticky material which was triturated with hexane to yield a granular brown solid. This solid was thoroughly washed with water, saturated sodium bicarbonate solution and water until the effluent was chloride free. The washed solid was then dried (97.7 g.) and exhaustively extracted with ether to give a kraft lignin 2,4-dichlorophenoxyacetate diatomaceous earth reaction product (86.8 g.).

EXAMPLE 3

2,4,5-trichlorophenoxyacetic acid (25.5 g.) was converted to its acid chloride as described in Example 1 and reacted with kraft lignin (30 g.) as outlined in Example 2. The crude reaction product (109 g.) was isolated using diatomaceous earth (53.5 g.) and purified to give a kraft lignin/2,4,5 - trichlorophenoxyacetate reaction product (94.1 g.).

EXAMPLE 4

A stirred mixture of 100 g. of dry kraft lignin, 33.4 g. of the acid chloride of trichloroacetic acid, 15 ml. of pyridine, and 500 ml. of dioxan, was refluxed for 3 hours and precipitated using 2500 ml. of hexane. The solid was washed three times with 800 ml. of water, air dried, and then oven dried to yield a kraft lignin/trichloroacetic acid reaction product which weighed 99.4 g. and which contained chlorine equivalent to 6.5% combined trichloroacetic acid.

EXAMPLE 5

Example 4 was repeated in its entirety, except pyridine and water were omitted. The solid obtained was a kraft lignin/trichloroacetic acid reaction product (114.5 g.) containing chlorine equivalent to 9.74% combined trichloroacetic acid.

EXAMPLE 6

A dry mixture of 100 g. of Douglas fir sawdust and 33.4 g. of the acid chloride of trichloroacetic acid in 15 ml. of pyridine and 500 ml. of benzene was refluxed for three hours and evaporated to dryness under reduced pressure. The residue was washed three times with 800 ml. of water, air dried and oven dried to yield a Douglas fir sawdust/trichloroacetic acid reaction product (113.1 g.) containing chlorine equivalent to 11.9% combined trichloroacetic acid.

EXAMPLE 7

A stirred solution of 100 g. of dry kraft lignin in 600 ml. of dioxane and 15 ml. of pyridine was refluxed for three hours with 33.9 g. of the acid chloride of 2,2-dichloropropionic acid. The mixture was concentrated to about one-half its bulk and precipitated using 3000 ml. of hexane. This solid was washed three times with 800 ml. of water, air-dried and oven dried to yield a kraft lignin/2,2-dichloropropionic acid reaction product (106.5 g.) containing 10.6% 2,2-dichloropropionic acid.

EXAMPLE 8

A mixture of 100 g. of dry Douglas fir sawdust and 33.9 g. of the acid chloride of 2,2-dichloropropionic acid in 500 ml. of benzene and 15 ml. of pyridine was refluxed for three hours and evaporated to dryness under reduced pressure. The residue was washed three times with 800 ml. of water and oven dried to yield a Douglas fir sawdust/2,2-dichloropropionic acid reaction product (101.4 g.) containing 13.7% 2,2-dichloropropionic acid.

EXAMPLE 9

A dry mixture of 100 g. of Douglas fir bark and 56.5 g. of the acid chloride of 2,2-dichloropropionic acid in 500 ml. of benzene and 25 ml. of pyridine was heated at reflux for three hours to yield 118.1 g. of chemically combined Douglas fir bark/2,2-dichloropropionic acid. The chemically combined Douglas fir bark/2,2-dichloropropionic acid reaction product contained 20.4% 2,2-dichloropropionic acid.

EXAMPLE 10

A mixture of 10 g. of 4-amino-3,5,6-trichloropicolinic acid and 60 ml. of thionyl chloride was refluxed for 75 minutes until a clear solution was obtained. The solution was evaporated to dryness under reduced pressure. The resulting residue, dissolved in 50 ml. of boiling benzene, was added to a stirred and refluxing solution of 100 g. of kraft lignin in 600 ml. dioxan and 15 ml. pyridine. After 1 hour the reaction mixture was precipitated using 2500 ml. of hexane. The precipitate was washed three times with 800 ml. of water, air dried and oven dried to yield a kraft lignin/4-amino-3,5,6-trichloropicolinic acid reaction product (94.4 g.) containing 7.6% chemically combined herbicide.

EXAMPLE 11

A mixture of 10 g. of 4-amino-3,5,6-trichloropicolinic acid and 60 ml. of thionyl chloride was refluxed 75 minutes until a clear solution was obtained and then evaporated to dryness under reduced pressure. The resulting residue, in 50 ml. of boiling benzene was added to a mixture of 100 g. of Douglas fir sawdust in 500 ml. benzene and 10 ml. pyridine, refluxed for three hours, and evaporated to dryness under reduced pressure. The residue was washed three times with 500 ml. of water and oven dried to yield a Douglas fir sawdust/4-amino-3,5,6-trichloropicolinic acid reaction product (108.6 g.) containing 8.35% by weight 4-amino-3,5,6-trichloropicolinic acid chemically combined with the sawdust.

EXAMPLE 12

A mixture of 10 g. of 4-amino-3,5,6-trichloropicolinic acid and 60 ml. of thionyl chloride was refluxed 75 minutes until a clear solution was obtained and evaporated to dryness under reduced pressure. The resulting residue, in 50 ml. of boiling benzene, was added to a mixture of 100 g. Douglas fir bark in 500 ml. benzene and 10 ml. pyridine. The residue was washed three times with 500 ml. of water and dried to yield a Douglas fir bark/4-amino-3,5,6-trichloropicolinic acid reaction product (106.7 g.) containing 11% by weight herbicide chemically combined with the bark.

EXAMPLE 13

A solution of 1,2,4-triazyl-3-ammonium lignosulfonate was prepared by neutralizing 100 g. of free sulfite lignin with 4.75 g. of 3-amino-1,2,4-triazole to a pH of 3.0. The solution was evaporated to dryness to yield the chemically combined pesticide. The product was dehydrated by heating to 150° for 20 hours. The residue, 33.5 g., was exhaustively extracted with ethanol to remove unreacted 3-amino-1,2,4-triazole. The product, 32 g., contained 5.22% nitrogen which is equivalent to 78 mg. of 3-amino-1,2,4-triazole per gram of product.

EXAMPLE 14

Douglas fir bark, chemically combined with 2,4-dichlorophenoxyacetic acid as described in Example 2 using kraft lignin, was prepared using varying amounts of herbicide. The amount of herbicide used was 10, 30, and 100 parts by weight herbicide per hundred parts by weight polymer substrate (phs). The resulting combined material was tested in a rainfall test calculated to correlate with natural rainfall conditions. The test was carried out by: (1) weighing out approximately 10 grams of each of the chemically combined pesticides, (2) placing the samples in sintered-bottom glass funnels, (3) putting the samples in a 90% humidity atmosphere to effectively retard any evaporation, (4) periodically pouring 100 ml. portions of distilled water over the samples, and (5) analyzing the aqueous extract for pesticide content by standard analytical methods.

TABLE I.—RELEASE OF CHEMICALLY COMBINED 2,4-DICHLOROPHENOXYACETIC ACID FROM BARK

| Douglas fir | | | | | |
|---|---|---|---|---|---|
| 10 phs | | 30 phs | | 100 phs | |
| Days elapsed | Percent release | Days elapsed | Percent release | Days elapsed | Percent release |
| 2 | 10 | 2 | 15 | 6 | 17 |
| 14 | 33 | 14 | 33 | 41 | 31 |
| 28 | 39 | 24 | 38 | 56 | 35 |
| 32 | 40 | 32 | 40 | | |
| 44 | 50 | 46 | 43 | | |

EXAMPLE 15

In order to test the release properties of 4-(2,4,5-trichlorophenoxy) butyric acid chemically combined with Douglas fir, hemlock, alder and cedar bark, 30 parts of the herbicide were chemically combined with 100 parts of the bark substrate by a process similar to that of Example 1. The reaction product was tested in the rainfall test described in Example 13 to indicate the release rate of the active herbicide. The results of this test are shown in Table II.

TABLE II.—RELEASE OF CHEMICALLY COMBINED 4-(2,4,5-TRICHLOROPHENOXY) BUTRYIC ACID FROM BARK

| Douglas fir, 30 phs | | Hemlock, 30 phs | | Alder, 30 phs | | Cedar, 30 phs | |
|---|---|---|---|---|---|---|---|
| Days elapsed | Percent release | Days elapsed | Percent release | Days elapsed | Percent release | Days elapsed | Percent release |
| 4 | 1.3 | 4 | 1.1 | 2 | 1.1 | 2 | 1.0 |
| 12 | 2.5 | 8 | 4 | 9 | 3.1 | 9 | 5 |
| 20 | 8 | 14 | 11 | 16 | 5.1 | 16 | 10 |
| 31 | 11.9 | 28 | 17.7 | 24 | 8.5 | 29 | 18.5 |
| 39 | 15.6 | 35 | 25.2 | 34 | 9.3 | 35 | 25 |

EXAMPLE 16

In order to test the release characteristics of 2,4-dichlorophenoxyacetic acid chemically combined with sawdust, herbicide compositions were prepared using varying amounts of herbicide by a process similar to that described in Example 2. The reaction products were tested in the rainfall test described in Example 14. The release characteristics of the compositions are shown in Table III.

TABLE III

| Douglas fir | | | | | |
|---|---|---|---|---|---|
| 10 phs | | 30 phs | | 100 phs | |
| Days elapsed | Percent release | Days elapsed | Percent release | Days elapsed | Percent release |
| 2 | 14 | 2 | 12 | 6 | 7 |
| 11 | 55 | 14 | 29 | 18 | 19 |
| 23 | 63 | 31 | 31 | 21 | 21 |
| 28 | 65 | 45 | 35 | | |
| 32 | 66 | | | | |
| 44 | 68 | | | | |

EXAMPLE 17

The release characteristics of 2,4-dichlorophenoxyacetic acid from fiberized wood substrate was tested by chemically combining 30 parts of weight herbicide with 100 parts by weight wood substrate by a process similar to that described in Example 2. The chemically combined herbicide/wood compositions were tested in the rainfall test described in Example 14 with the following results:

TABLE IV

| Douglas fir, 30 phs | | Hemlock, 30 phs | |
|---|---|---|---|
| Days elapsed | Percent release | Days elapsed | Percent release |
| 2 | 9 | 2 | 15 |
| 14 | 26 | 11 | 41 |
| 21 | 31 | 21 | 21 |
| 25 | 32 | 24 | 24 |
| 45 | 37 | 45 | 56 |

EXAMPLE 18

The release characteristics of 2,4-dichlorophenoxyacetic acid chemically combined with kraft lignin, cellulose, soybean flour, and the alkaline extract of Douglas fir bark were tested. The herbicide was chemically combined with the polymer substrate in a manner similar to that of Example 2. The reaction products were tested using the rainfall test described in Example 14. The results are shown in Table V.

TABLE V.—RELEASE OF CHEMICALLY COMBINED 2,4-DICHLOROPHENOXYACETIC ACID FROM KRAFT LIGNIN, CELLULOSE, SOYBEAN FLOUR, AND THE ALKALI EXTRACT OF DOUGLAS FIR BARK

| Kraft lignin, 10 phs | | Kraft lignin, 10 phs | | Cellulose, 10 phs | | Cellulose, 30 phs | | Soybean flour, 10 phs | | Soybean flour, 10 phs | | Douglas fir bark extract, 10 phs | |
|---|---|---|---|---|---|---|---|---|---|---|---|---|---|
| Days elapsed | Percent release | Days elapsed | Percent release | Days elapsed | Percent release | Days elapsed | Percent release | Days elapsed | Percent release | Days elapsed | Percent release | Days elapsed | Percent release |
| 4 | 1 | 5 | 4 | 2 | 55 | 2 | 41 | 2 | 21 | 2 | 23 | 3 | 51 |
| 13 | 10 | 15 | 6 | 14 | 68 | 14 | 65 | 11 | 48 | 14 | 63 | 17 | 51.4 |
| 25 | 15 | 25 | 11 | 31 | 72 | 24 | 66 | 21 | 55 | 28 | 74 | | |
| 28 | 17 | 29 | 13 | 49 | 76 | 32 | 66 | 31 | 58 | 32 | 76 | | |
| 43 | 27 | 43 | 19 | | | 42 | 68 | 46 | 65 | 44 | 89 | | |

EXAMPLE 19

The release characteristics of 4-(2,4,5-trichlorophenoxy) butyric acid chemically combined with kraft lignin, sulfite lignin and the alkali extract of Douglas fir bark were tested using the rainfall test described in Example 14. The herbicides were chemically combined with the substrates similarly to that described in Example 1. The results are shown in Table VI.

TABLE VI.—RELEASE OF CHEMICALLY COMBINED 4-(2,4,5-TRICHLOROPHENOXY) BUTYRIC ACID FROM KRAFT LIGNIN, SULFITE LIGNIN, AND THE ALKALI EXTRACT OF DOUGLAS FIR BARK

| Kraft lignin, 18.6 phs | | Kraft lignin, 30 phs | | Sulfite lignin, 44 phs | | Douglas fir bark extract, 39 phs | |
|---|---|---|---|---|---|---|---|
| Days elapsed | Percent release | Days elapsed | Percent release | Days elapsed | Percent release | Days elapsed | Percent release |
| 4 | 0.7 | 4 | 0.3 | 13 | 3.2 | 7 | 1 |
| 13 | 7.6 | 14 | 0.7 | 21 | 5.3 | 21 | 3.2 |
| 21 | 9.2 | 25 | 1.2 | | | | |
| 42 | 16 | 32 | 1.4 | | | | |

EXAMPLE 29

Red alder and Douglas fir seedlings were grown together in 4" x 4" one quart plastic containers provided with Astoria soil. When the plants had grown to about 6" in height, an herbicidal amount of various herbicidal compositions was applied. The herbicide compositions included 4-(2,4,5-trichlorophenoxy) butyric acid chemically combined with sawdust, bark, kraft lignin, and sulfite lignin. At the end of six months, the condition of the plants was observed. The dead plants were replanted and a second observation was made three months later. The herbicide compositions were applied in several dosages. The results of these tests are tabulated in Table VII.

TABLE VII.—RELEASE 2,4,5-TB HERBICIDE—POT STUDIES

| | Grains treatment per pot | Alder | | D. fir | |
|---|---|---|---|---|---|
| | | After 6 months | | 3 months after replanting | |
| Sawdust-herbicide | 40 | X | N | X | N |
| | 10 | X | N | N | N |
| Bark-herbicide | 40 | D | N | D | X |
| | 20 | D | N | X | N |
| | 10 | X | N | X | N |
| | 5 | X | N | X | N |
| | 2 | X | N | X | N |
| NH₄ lignosulfonate-herbicide | 30 | D | X | D | N |
| | 15 | D | N | D | N |
| | 7 | D | N | N | N |
| | 3 | X | N | N | N |
| Kraft lignin-herbicide | 40 | D | D | N | N |
| | 20 | D | N | N | N |
| | 10 | D | N | N | N |
| | 5 | D | N | N | N |

NOTE.—D=dead; X=herbicidal damage; N=no effect or damage.

EXAMPLE 21

Fifty g. of chemically combined 2,4-D/hemlock sawdust prepared in a manner similar to that of Example 2 was evenly distributed on the surface of a 3' x 3' lawn test plot having a heavy infestation of the broad leafed weeds (*Veronica filiformis, Hypochaerus radicata* L., *Taraxacum officinale, Cerastium vulgatum* L. and *Trifolium dubium*). The rate of application was equivalent to 530 lbs. per acre of the herbicide composition or 123 lbs. per acre of the 2,4-D acid. The herbicidal composition was composed of 30 parts by weight 2,4-D to 100 parts by weight hemlock sawdust.

After three days there was general but noticable yellowing of the weeds in the plot. After nine days all of the weeds in the plot showed noticeable phytotoxic effects. After twenty days most of the weeds were dead or dying. Grasses growing in the test plot appeared to be completely unaffected.

After two months the plot was again examined. All older broad leafed weeds in the plot were dead and no new weeds were growing. After three months the appearance of the plot was virtually unchanged from the condition observed at the end of two months, indicating that the herbicide was being released in amounts sufficient to prevent new growth and control older growth.

EXAMPLE 22

Herbicidal compositions containing Silvex (2-[2,4,5-trichlorophenoxy] propionic acid) chemically combined with Douglas fir bark and kraft lignin were prepared in a manner similar to that described in Example 2. These compositions were used to determine if they would adequately (1) control germinating weed seeds in the top ¼" to ½" layer of soil; (2) reduce leaching of active herbicide so as to preclude damage to a deeper rooted crop such as corn even under heavy conditions of rainfall; and (3) increase persistence with respect to weed control.

The test were conducted as follows: 6-inch pots were filled with soil and corn was sowed at a depth of 2 inches. The pots were watered as necessary until the corn seedlings were two to three inches tall at which time weed seeds were sown on the soil surface and mulched with soil to a depth of ¼ to ½ inches.

After mulching, standards were applied to the soil surface as a spray in a total volume of 5 ml. per pot (270 gls. per acre) which gave complete coverage.

The sustained release compositions were applied to the entire soil surface in dry from. Required amounts of all the compositions were combined with appropriate inert substrate in scintillation counter vials so that the total weight of active composition plus inert substrate to be applied to each pot was 500 mg (230 lbs. per acre). This was sufficient to give complete and uniform distribution of material on the soil surface. The soil surfaces to which the herbicidal compositions were to be applied were moistened immediately before application and the dry formulation sprinkled on the soil surfaces.

After applying the compositions, a heavy watering was applied (1 acre inch). By this time, corn roots were usually visible at the bottom of the pots. The 1-acre inch application of water completely permeated the soil mass. Water was subsequently applied as needed in ¼ acre inch increments until the experiments were graded. Usually 4.5 to 5.0 per acre inches were applied during a two week period.

After initial grading, weeds were removed, and weed seeds resown and watering continued. Resowing weed seed was done so that the residuality of the herbicidal compositions could be determined.

The results of the test are shown in Table VIII. The data indicate that the Silvex/Douglas fir bark and Silvex/kraft lignin compositions are more selective toward corn than uncombined Silvex with comparable or greater persistence and efficacy of herbicidal activity toward the weeds. The advantage of the chemically combined herbicide composition increased selectivity to deep rooted plants such as corn.

TABLE VIII

| Sample | Rate[1] | 2 weeks after application, percent growth reduction | | 8 weeks after application, growth reduction | | |
|---|---|---|---|---|---|---|
| | | Corn | Wild mustard | Corn | Wild mustard | Pig weed |
| Silvex | 10 | [2]30 | 100 | [2]30 | 90 | 93 |
| Silvex/Douglas fir bark (31.2% Silvex) | 10 | [2]15 | 100 | 0 | 90 | 85 |
| Silvex/kraft lignin (23.3% Silvex) | 10 | 0 | 99 | 0 | 95 | 95 |

[1] Pounds active ingredient/acre.
[2] Formative effects.

EXAMPLE 23

Similar tests to that described in Example 22 were carried out using herbicidal compositions containing 2,4-D chemically combined with Douglas fir sawdust, Douglas fir bark and kraft lignin. The results are shown in Table IX. The data show enhanced selectivity toward corn and peanuts with herbicidal activity to weeds comparable to that of uncombined 2,4-D can be obtained with the compositions even when subjected to heavy watering. The data also indicate greater persistence in soil for the chemically combined herbicide compositions.

TABLE IX

| Sample | Rate[1] | Percent growth reduction | | | | | | | |
|---|---|---|---|---|---|---|---|---|---|
| | | 2 weeks after application | | | 4 weeks after application | | | 7 weeks after application | | |
| | | Corn | Peanuts | Wild mustard | Corn | Peanuts | Wild mustard | Corn | Peanuts | Wild mustard |
| 2,4-D | 10 | [2]80 | [2]60 | 100 | [2]20 | [2]75 | 55 | -------- | 40 | 15 |
| 2,4-D/Douglas fir sawdust (36.4% 2,4-D) | 10 | [2]0 | [2]30 | 100 | 0 | [2]25 | 50 | -------- | [2]10 | 60 |
| 2,4-D/Douglas fir bark (21.6% 2,4-D) | 10 | [2]45 | [2]60 | 100 | 0 | [2]60 | 65 | -------- | 25 | 65 |
| 2,4-D/kraft lignin (16.0% 2,4-D) | 10 | 25 | [2]40 | 100 | 0 | 20 | 53 | -------- | 10 | 30 |

[1] Pounds active ingredient/acre.
[2] Formative effects.

I claim:

1. In a substantially water insoluble pesticidal composition comprising a polymer substrate having pendent herbicidal substituents chemically bonded thereto through ester or amide linkages which can be broken by hydrolysis under environmental conditions to generate active herbicide, both said substrate and said active herbicide having substituent groups which react to form said linkages and which are selected from carboxyl, hydroxyl, and amino groups, the weight ratio of herbicide to substrate ranging from 0.01 to 1 to 2 to 1, the improvement which comprises:
   selecting said substrate from natural polymers in the group consisting of lignin containing materials, cellulose, and proteinaceous materials containing primary amino groups.

2. The composition of claim 1 wherein the herbicide is 2,4-dichlorophenoxyacetic acid.

3. The composition of claim 1 wherein in the herbicide is 2-(2,4,5-trichlorophenoxy) propionic acid.

4. The composition of claim 1 wherein the herbicide is 2,4,5-trichlorophenoxyacetic acid.

5. The composition of claim 1 wherein the herbicide is 4-(2,4,5-trichlorophenoxy) butyric acid.

6. The composition of claim 1 wherein the herbicide is 4-amino-3,5,6-trichloropicolinic acid.

7. The composition in claim 1 wherein the natural polymer substrate is a lignin containing material.

8. The composition of claim 7 wherein the lignin containing material is kraft lignin.

9. The composition of claim 7 wherein the lignin containing material is sulfite lignin.

10. The composition of claim 7 wherein the lignin containing material is comminuted wood.

11. The composition of claim 7 wherein the lignin containing material is tree bark.

12. The composition of claim 7 wherein the lignin containing material is bark phenolic acids obtained by alkaline extraction of tree bark.

13. A substantially water insoluble herbicidal composition capable of release of phytocidal amounts of an herbicide comprising a lignin containing polymer substrate chemically combined with 2,4-dichlorophenoxyacetic acid, the composition capable of generating the active herbicide on hydrolysis of the attaching chemical bond, the weight ratio of herbicide to polymer substrate ranging from 0.01 to 1 to 2 to 1.

14. In a method of controlling the growth of undesirable vegetation comprising applying to the situs about which said vegetation grows a phytocidal amount of a substantially water insoluble pesticidal composition comprising a polymer substrate having pendent herbicidal substituents chemically bonded thereto through ester or amide linkages which can be broken by hydrolysis under environmental conditions to generate active herbicide, both said substrate and said active herbicide having substituent groups which react to form said linkages and which are selected from carboxyl, hydroxyl, and amino groups, the weight ratio of herbicide to substrate ranging from 0.01 to 1 to 2 to 1, the improvement which comprises:
   selecting said substrate from natural polymers in the group consisting of lignin containing materials, cellulose, and proteinaceous materials containing primary amino groups.

15. The method of claim 14 wherein the herbicide is 2,4-dichlorophenoxyacetic acid.

16. The method of claim 14 wherein the herbicide is 2-(2,4,5-trichlorophenoxy) propionic acid.

17. The method of claim 14 wherein the herbicide is 2,4,5-trichlorophenoxyacetic acid.

18. The method of claim 14 wherein the herbicide is 4-(2,4,5-trichlorophenoxy) butyric acid.

19. The method of claim 14 wherein the herbicide is 4-amino-3,5,6-trichloropicolinic acid.

20. The method of controlling the growth of undesirable vegetation comprising applying to the soil in which the undersirable vegetation grows a phytocidal amount of a substantially water insoluble herbicidal composition comprising a lignin containing material chemically combined with 2,4-dichlorophenoxyacetic acid, the herbicide composition capable of generating the active herbicide by hydrolysis of the attaching chemical bond under environmental conditions, the weight ratio of herbicide to lignin containing material in said herbicidal composition ranging from 0.01 to 1 to 2 to 1.

References Cited
UNITED STATES PATENTS

| 2,739,052 | 3/1956 | Morrill | 71—117 |
|---|---|---|---|
| 2,503,297 | 4/1950 | Pierce | 260—124 |
| 3,343,941 | 9/1967 | Baltazzi | 71—71 |
| 3,074,845 | 1/1963 | Geary | 424—23 |
| 3,081,293 | 3/1963 | Doughty | 260—124 |
| 2,938,893 | 5/1960 | Gray et al. | 260—124 |
| 3,121,708 | 2/1964 | Engelmann | 260—124 |
| 2,936,227 | 5/1960 | Gysin et al. | 71—93 |
| 3,297,697 | 1/1967 | Reynolds et al. | 71—93 |
| 3,470,148 | 9/1969 | Allan | 71—Dig. 1 |

GLENNON H. HOLLRAH, Primary Examiner

U.S. Cl. X.R.

71—79, 88, 92, 105, 106, 107, 113, 114, 115, 116, 117, 118, 120, Dig. 1; 424—217, 220, 268, 298, 320, 324, 359, 362, 364

UNITED STATES PATENT OFFICE
CERTIFICATE OF CORRECTION

Patent No. 3,813,236  Dated May 28, 1974

Inventor(s) George Graham Allan

It is certified that error appears in the above-identified patent and that said Letters Patent are hereby corrected as shown below:

In column 7, Table V, 3rd group of figures from left of table and reading from top to bottom (Kraft lignin, 10 phs, Days elapsed), "5  15  25  29  43" should read --4  15  25  29  43-- and in column 9, line 12, "Example 29" should read --Example 20--.

Signed and sealed this 5th day of November 1974.

(SEAL)
Attest:

McCOY M. GIBSON JR.
Attesting Officer

C. MARSHALL DANN
Commissioner of Patents